Nov. 14, 1933.  E. BABCOCK  1,934,690

ABSORPTION REFRIGERATION

Filed Feb. 2, 1931

Witness:  
R. B. Davison.

Inventor:  
Earl Babcock.  
By: Harry S. Dumaree  
Atty

Patented Nov. 14, 1933

1,934,690

UNITED STATES PATENT OFFICE 1,934,690

ABSORPTION REFRIGERATION

Earl Babcock, Chicago, Ill., assignor to The Hoover Company, North Canton, Ohio, a corporation of Ohio Application February 2, 1931. Serial No. 512,771

7 Claims. (Cl. 62—119.5)

This invention relates to absorption refrigerating apparatus and more particularly to apparatus of the type in which an auxiliary agent is employed to exert a certain pressure in the evaporator.

In absorption refrigerating apparatus of the type employing an inert gas as an auxiliary agent, the gas has been circulated between the evaporator and absorber in various ways, as by means of mechanically driven fans, jets fed by the refrigerant gas generated in the boiler, means for heating and cooling various portions of the inert gas circuit and by employing an inert gas having a marked difference in specific gravity than that of the refrigerant gas used in the system so that circulation is effected by gravity. In those systems where the inert gas is circulated by the force of gravity, the circulation is not always reliable and is generally deemed less satisfactory than that where an impulse is positively imparted to the inert gas to circulate it. However, the means heretofore proposed for positively actuating the inert gas make it necessary, in the case where a fan is used, to provide for the transmission of power thru the walls of a vessel, entailing the necessity of an undesirable stuffing box or the like, or to utilize a portion of the refrigerant vaporized in the boiler for circulating the gas without producing any useful cooling effect.

It is an object of the present invention to positively circulate an auxiliary agent, such as an inert gas in an absorption refrigerating apparatus without the use of mechanically moving parts and without using a portion of the refrigerant vapor generated in the boiler for this purpose.

A further object of the invention is to circulate an inert gas or other auxiliary agent between an evaporator and an absorber of a refrigerating system by means of a stream of absorption liquid entering the absorber and/or a stream of liquid entering the evaporator.

Another object of the invention is to drive the absorption liquid and the gases entering the absorber into intimate contact so as to improve the efficiency of the absorber as well as provide for the positive circulation of the gases therethru.

Another object is to provide a refrigerating system employing an auxiliary agent but in which the auxiliary agent only partly equalizes the pressure so that there is an actual difference in total pressure between the evaporator and the condenser.

Another object is to improve the operation of absorption refrigerating apparatus by maintaining a higher total pressure in the absorber than that in the evaporator.

Still another object is to provide an improved boiler system to insure the delivery of weak absorption liquid to the absorber so that the size of the absorber may be somewhat smaller and operate at a higher temperature than is usually the case in systems designed for a given capacity.

Other objects and advantages will be more apparent from the following description when taken in connection with the accompanying drawing.

Figure 1:
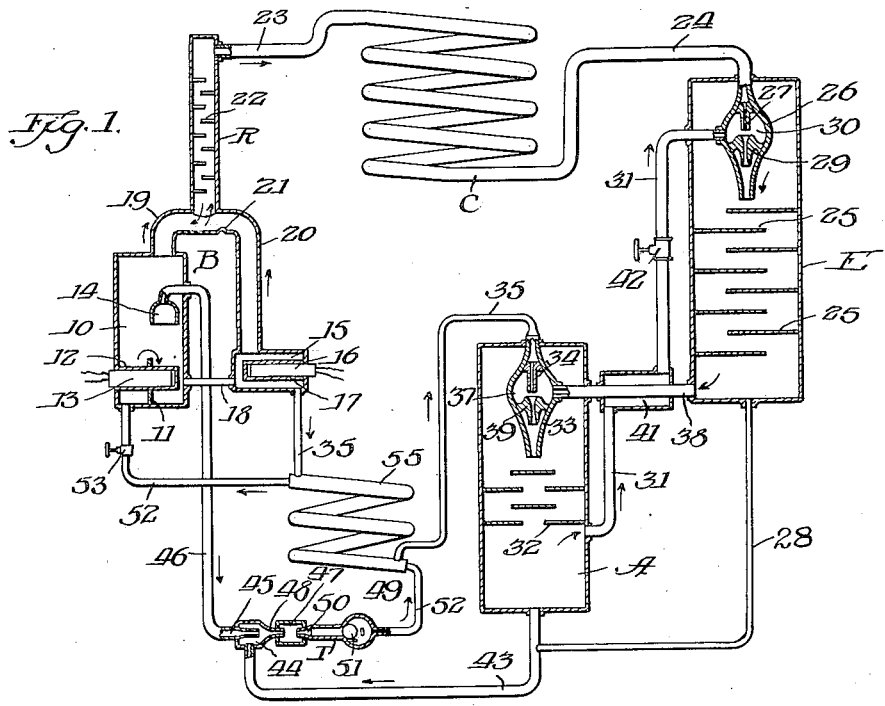
Fig. 1 is a diagrammatic showing of a complete absorption refrigerating system designed to carry out the principles of the invention, some of the parts of which are shown in cross section.

Referring to Figure 1, a refrigerating system is there shown as consisting of a boiler system designated generally by the character B, a rectifier R, a condenser C, an evaporator E, an absorber A and an injector I, these parts being connected by suitable conduits some of which are in heat exchange relation as will be explained hereinafter. It will be apparent that the illustration is only diagrammatic and is not intended to illustrate the construction and arrangement as embodied in an actual working machine. Apparatus of the same general type is now well known and except for the injector is usually made from a number of seamless steel pipes, these being of various sizes to provide the proper volume and shape, as is well known in the art.

The boiler system includes a vessel designated 10 which is preferably provided with a vertically arranged internal baffle plate 11 at its lower end and a horizontally arranged tube 12 which extends thru the wall of the vessel and through the baffle 11 to form a pocket adapted to receive an electric cartridge heater 13 or other suitable heating means. This vessel also contains a dome 14 for use in connection with the injector I as will be explained hereinafter. In addition to the main boiler 10 a small auxiliary boiler is provided by the vessel 15 which also has a small tube 16 adapted to receive a second heater 17. The lower portions of the vessels 10 and 15 are connected by a pipe 18 and their upper ends are connected to the rectifier R by the gas conduits 19 and 20. At a point beneath the rectifier and slightly to the right thereof (as illustrated in Fig. 1) a portion of the conduit 20 is struck up to form an internal ridge 21, which causes liquid dripping from the rectifier to return to the main boiler 10 instead of flowing back to the auxiliary boiler 15. The heat supplied to the boilers 10 and 15 may be independently varied either manually or by thermostatic control circuits associated with the heaters.

The rectifier R is shown as made up of a piece of pipe provided with baffle plates 22 on the inside thereof. Heat radiating fins may be provided on the outside also if desired.

The condenser C is shown as consisting merely of a coil of pipe. It may be provided with heat radiating fins in case it is desired to air cool the apparatus or a jacket may be provided for cooling the same by the flow of cooling water around the coil. The upper end of the condenser is connected to the top of the rectifier by the pipe 23 while the lower end is connected to the top of the evaporator by the pipe 24.

The evaporator consists of a closed vessel provided with a series of staggered baffle plates 25 arranged internally thereof in its lower portion and a mixing device 26 near its upper end. The mixing device may also act as an expansion valve. This device consists merely of a small jet or nozzle 27 connected to the liquid supply line 24 from the condenser, a restricted portion 28 arranged directly beneath the nozzle to provide a venturi and a chamber 29 between the nozzle and venturi adapted to be supplied with gas from the conduit 31 which is connected to the absorber. Assuming that liquid is supplied to the conduit 24 at a pressure higher than that in the evaporator E, a jet of liquid will pass thru the nozzle 27 and venturi 29 and in so doing will force gases in the chamber 30 thru the venturi into the main body of the evaporator E. In so doing an intimate mixture of the liquid and gas will take place and evaporation of the refrigerant liquid will take place rapidly. The nozzle 27 may be so proportioned that it will maintain the proper difference in pressure between the liquid in the conduit 24 and the fluid in the evaporator E. If desired however, a suitable needle valve or other suitable expansion valve may be placed in the conduit 24 to regulate the passage of liquid therethru in addition to the regulation effected by the nozzle 27.

Absorber A may be made substantially like evaporator E. As shown in Figure 1, however, a slightly different construction is shown in which the baffles 32 are somewhat differently arranged and in which the lower portions contain no baffles, it being desirable to utilize this portion as a reservoir for absorption liquid. The upper portion of the absorber contains a mixing device 33 similar in all respects to the mixing device 26 in the top of the evaporator. The nozzle 34 of this mixing device is supplied with liquid thru a conduit 35 coming from the boiler B while gases are supplied to the chambers 37 by a conduit 38 connected to the bottom of the evaporator. In this way, gases are caused to pass from the evaporator to the absorber as a jet of liquid passes thru the nozzle 34 and the venturi 39. Like the mixing device 26 it also functions as a reducing valve for maintaining some difference in pressure between the liquid in the pipe 35 and the fluids in the absorber A and also provides means for intimately mixing the liquid, which in this case is absorption liquid, entering the absorber thru the pipe 35 and the gases entering thru the pipe 38. Because of this mixing the refrigerant gas is quickly absorbed in the absorption liquid.

The gas conduit 31 is connected to the absorber at a point just beneath the baffle plates 32 and to the chamber 30 of the mixing device 26, while the gas conduit 38 connects the lower portion of the evaporator to the mixing chamber 37 of the mixing device 33. As is diagrammatically illustrated at 41, these two gas conduits 31 and 38 may be in heat exchange relation with each other. It is obvious that any suitable gas heat exchanger may be incorporated at this point. The gas pipe 31 is also provided with a valve 42 or other means for restricting or regulating the flow of gases therethru. It will be obvious that by manipulating this valve a predetermined difference in total pressure may be maintained between the evaporator and absorber due to the increase in pressure in the absorber caused by the blowing of gases thru the mixing device 33.

As mentioned above a conduit 35 is connected to the nozzle 34 of the mixing device 33 and to the boiler system. As shown this conduit is connected to the bottom of the auxiliary boiler 15 so that liquid may flow from that vessel to the nozzle 34. Conduit 35 may also be provided with a regulating valve so as to maintain a proper difference in pressure between the boiler system and the absorber A although this may be unnecessary if the nozzle 34 is properly designed.

For returning absorption liquid to the boiler system from the absorber a conduit 43 is connected to the bottom of the absorber and to the injector I. The injector I is diagrammatically illustrated as of a well known type and per se forms no part of the present invention. As shown it consists of a liquid receiving chamber 24 containing a nozzle 45 adapted to be fed by gas from the boiler B thru the pipe 45 connected to the dome 14, a mixing or cooling chamber 47 connected to the chamber 44 by a restricted passage 48 and a ball valve 49 connected to the cooling chamber 47 by another restricted passage 50 aligned with passage 48. The ball 51 in the valve 49 is adapted to seat against the opening from the valve chamber to the passage 50 and prevent the flow of liquid from the valve to the chamber 47 but permit the free flow of liquid from that chamber to the pipe 52 connected to the valve. The pipe 52 leads to the lower portion of the main boiler 10 at a point to the left of the baffle 11. This pipe is shown as provided with a regulating valve 53.

If desired the valve 53 may be controlled by automatic float controlled apparatus responsive to the level of the liquid in the vessel 10 so as to prevent the injector from flooding the boiler system. Ordinarily regulation may be effected, however, by the dome 14 which is so located that the supply of gas to the nozzle 45 of the injector is cut off upon the liquid in the vessel 10 sealing the lower end of the dome. Upon the liquid in the vessel 10 rising therefore, up to the lower edge of the dome 14 the injector will cease functioning until the level again falls to permit gases to enter the dome 14.

The injector I is similar to well known steam injectors used in connection with boilers for steam heating plants, power stations, etc. Since substantially all of the heat conveyed to the injector by the gases flowing thru the pipe 46 is transferred to the liquid entering the boiler system, this injector offers a very efficient means for pumping liquid from the absorber A. In an ordinary steam injector, the pumping action results from the condensing of steam in a chamber, such as shown at 47, due to the mixing of water at a lower temperature with the steam in the chamber 44 and restriction 48. This causes a reduction in pressure in the chamber 47 and causes the inrushing fluids entering the chamber thru the passage 48 to drive liquid into the passage 50. In the present apparatus because of the fact that the gas supplied by the pipe 46 will be largely refrigerant vapor and the liquid to be pumped will be absorption liquid, the injector should accordingly be designed somewhat differently from that of an ordinary steam injector so as to take this into account. Since the injector per se is well known and forms no part of the present invention it is deemed unnecessary to describe it further here. In fact the invention is not limited in any way to the use of an injector and an ordinary motor driven circulating pump may be substituted for the injector shown if desired without departing from the spirit of the invention. Such an arrangement could of course, be so constituted that the motor for the pump would be controlled by the level of the liquid in the boiler system so as to effect the proper regulation.

The pipes 35 and 52 of the absorption liquid circuit may be in heat exchange relation as indicated at 55, provision for this being made by the use of a double coil heat exchanger such as indicated.

The apparatus described lends itself well to use in systems where the heat radiating parts are entirely air cooled. The absorber may be provided with heat radiating fins for this purpose if desired. The invention is not limited to the use of air cooled machines however, and if desired the absorber may be provided with a cooling jacket or coils for the purpose of bringing cooling water in heat transfer relation with the fluids therein.

For the purpose of describing the operation of the apparatus shown in Figure 1 it will be assumed that ammonia, water and hydrogen are used as the refrigerant, the absorption liquid and the auxiliary agent respectively although the invention is not limited to the use of these fluids. In charging the apparatus, a quantity of aqueous ammonia of commercial concentration, which is in the neighborhood of 30% by weight is put in the apparatus thru a suitable charging valve (not shown) in the boiler 10, the quantity being sufficient to provide a certain excess in the lower portion of its absorber A as well as sufficient to fill the conduits 35 and 52, auxiliary boiler 15 and the boiler 10 up to approximately the level of the dome 14. Anhydrous ammonia may then be added to sweep air out of the remainder of the apparatus, provision for the escape of air being provided by a suitable valve (not shown) on the absorber or the evaporator. Sufficient anhydrous ammonia should be added so that during the operation the average concentration of the absorption solution will be in the neighborhood of 20 to 30% by weight. Hydrogen should then be forced into the evaporator to raise the total pressure of the machine nearly to the condensing pressure of ammonia at the temperature at which the condenser is intended to operate. If the apparatus is air cooled, in which case liquid ammonia must condense in the condenser C at a temperature from 75 to 100° F., hydrogen should be added until the total pressure is in the neighborhood of 250 pounds per square inch. Upon heat being supplied to the boiler system the pressure therein will rise above that in the evaporator and ammonia will begin to condense in the condenser C and as liquid ammonia is supplied to the evaporator circulation of the inert gas will take place between the evaporator and the absorber in the direction indicated by the arrows at the side of the pipes 31 and 38 and the liquid ammonia will begin to evaporate in the evaporator to produce a cooling effect. It may be necessary to trim the apparatus when it is being started for the first time to effect the proper pressure conditions. By "trimming" is meant the addition or removal of any of the fluids used.

Upon the level of the liquid in the boiler dropping due to the expulsion of refrigerant vapor therefrom gas will be supplied to the injector and circulation of the absorption solution will take place from the vessel 10 to the conduit 18, auxiliary boiler 15, pipe 35, mixing device 33, absorber A, pipe 43, injector I and back to the vessel 10 thru the conduit 52. The refrigerant evaporated in the evaporator will pass into the absorber and be absorbed by the absorption solution and return to the boiler system. The auxiliary boiler 15 will function to reduce the concentration of the solution somewhat further than that which usually flows to the absorber in a system of this nature because of the fact that it may be operated at a higher temperature than that of the vessel 10 so as to drive off more refrigerant vapor. In so doing more water vapor will be expelled than is the case in the vessel 10 but due to the fact that the rectifier drains into the boiler 10 rather than into the auxiliary boiler 15, the solution leaving the latter will not be strengthened by the return from the rectifier.

It will be apparent that with the arrangement shown the evaporator will operate at a slightly lower total pressure than that of the absorber and the absorber will operate at a slightly lower total pressure than that of the boiler and condenser. Operation at these pressures is desirable because of the fact that the lower the total pressure in the evaporator the more readily the refrigerant will evaporate therein while the higher the pressure in the absorber, the more easily the refrigerant will be absorbed and the higher the pressure in the condenser the more readily the refrigerant will be condensed. It is for this reason that the system is especially suitable where it is desired to air cool the condenser and absorber since the intended changes in state may take place therein even though the temperatures are relatively high as compared with water cooled inert gas systems.

Figures 2, 3:
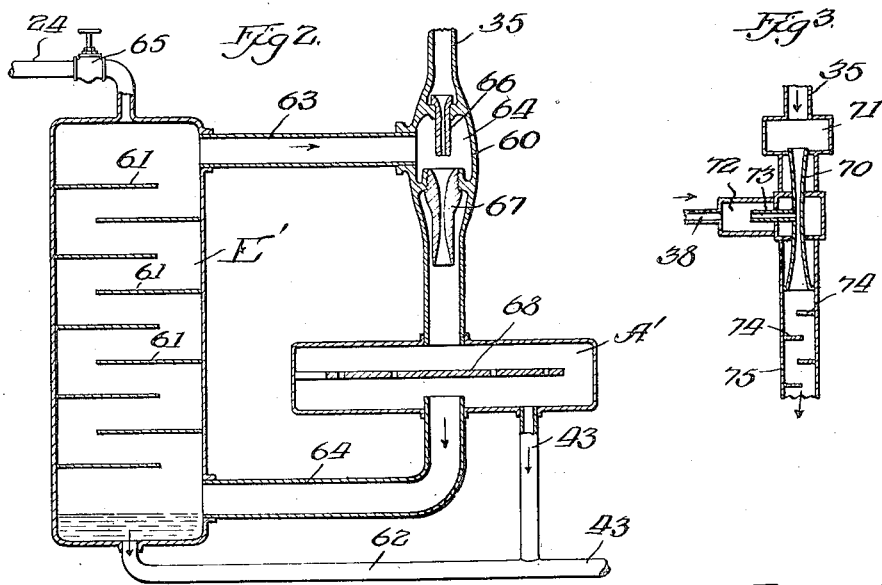
Fig. 2 is a diagrammatic cross sectional view of a modified evaporator and absorber system which may be substituted for the similar structure of Fig. 1
Fig. 3 is a fragmentary cross sectional view of an aspirator of a construction different from the similar devices shown in Figures 1 and 2.

Figure 2 illustrates an arrangement in which the evaporator and absorber are intended to operate at the same total pressure although this pressure is somewhat less than the pressure in the condenser. Circulation of the inert gas is effected by means of a mixing device like that shown at 33 in Figure 1 but no mixing device is provided in the evaporator and the conduits interconnecting the evaporator and the absorber do not contain restrictions or valves such as shown at 42 of Figure 1. In Figure 2 the evaporator is designated E', the absorber A' and the mixing device by the numeral 60. The evaporator E' consists merely of a cylindrical vessel closed at the top and bottom and provided with a series of staggered baffle plates 61. A drain pipe 62 is connected to the drain pipe 43 which conveys absorption solution away from the absorber A'. The upper end of the evaporator is connected by the gas conduit 63 to the chamber 64 of the mixing device 60 where the lower end of the evaporator is connected by a gas conduit 64 to the lower portion of the absorber A', this conduit terminating at a slightly higher level in the absorber than the liquid drain pipe 43. Liquid refrigerant is supplied to the evaporator E' thru a pipe 24 which is provided with an expansion valve 65.

As ammonia solution passes thru the pipe 35 and nozzle 66 and venturi 67 of the mixing device, the inert gas is blown with it thru the venturi 67 and against the baffle plate 68 in the absorber A'. Because of the fact that an intimate mixture takes place in the mixing device the absorber may be very small, provided sufficient cooling is provided. The absorber of this figure must be more effectively cooled, however, than the arrangement shown in Figure 1 because of the fact that it operates at the same total pressure as the evaporator E' whereas the absorber A of Figure 1 is intended to operate at a higher pressure than the evaporator E.

Figure 3 illustrates a different form of mixing device than that shown in Figures 1 and 2. The construction illustrated is similar to those aspirators commonly used for removing gases from a vessel by the flow of liquid thru a Venturi device. As shown the device consists of a Venturi pipe 70 adapted to be fed by liquid contained in a chamber 71 connected to the liquid supply pipe 35. Because of the increase in velocity as the liquid passes thru the restricted portion of the venturi, there is a reduction in pressure at this point and this causes the passage of gases from the chamber 72 thru the small pipe 73 connected to the restricted part of the venturi. When the device of Figure 3 is used instead of the mixing device of Figure 1 the gases may be supplied to the chamber 72 thru the pipe 38 as indicated. The liquid and gases passing thru the Venturi 70 are thrown against the staggered baffle plates 74 located just beneath it in an absorber pipe 75. A mixing device of this type may be substituted for that shown at 60 of Figure 2 or for that shown at 26 or 33 of Figure 1.

It will be obvious that many changes may be made in the arrangement and construction of parts, other than those indicated without departing from the spirit of the invention or the scope of the annexed claims. Some of the features are not limited to an apparatus employing inert gas but may be used to advantage in machines employing more than one refrigerant as well as those which do not employ an auxiliary agent at all. Also by suitable modification, certain of the features may be adapted for use in what has come to be known as "resorber" systems in which the refrigerant is absorbed in a strong solution instead of being changed to its liquid state as it passes from the boiler to the evaporator. In the following claims the word "condenser" is intended to include a resorber which may be regarded as changing a substance to a more condensed fluid phase rather than to its pure liquid phase.

I claim:—

1. The combination with the evaporator of a refrigerating apparatus of conduits for conveying a liquid and a gas to the evaporator and means associated with said conduits for intimately mixing the liquid with the gas as they enter said evaporator, said means including a nozzle connected to the liquid conveying conduit, a Venturi passage aligned with the nozzle and a chamber between the nozzle and Venturi passage connected to the gas conveying conduit.

2. In absorption refrigerating apparatus having a boiler, a condenser, an evaporator and an absorber, means for circulating an auxiliary agent in a local cycle between the evaporator and the absorber, means including a device for forcing inert gas from the evaporator into the absorber and a device for restricting the flow of inert gas from the absorber to the evaporator for causing the absorber to operate at a total pressure materially higher than that in the evaporator and means for causing the boiler and condenser to operate at a total pressure materially higher than that in the absorber.

3. In absorption refrigerating apparatus having a boiler, a condenser, an evaporator and an absorber, means for circulating an auxiliary agent in a local cycle between the evaporator and the absorber, and means including a device for forcing inert gas from the evaporator into the absorber and a device for restricting the flow of inert gas from the absorber to the evaporator for causing the absorber to operate at a total pressure materially higher than that in the evaporator.

4. In continuous absorption refrigerating apparatus, the combination with a boiler, a condenser, an evaporator and an absorber of a conduit for conveying refrigerant vapor from the boiler to the condenser, a conduit for conveying condensed refrigerant from the condenser to the evaporator, an expansion valve in said condensed refrigerant conduit, means for circulating an auxiliary agent between the evaporator and the absorber, means for maintaining the absorber at a higher total pressure than that prevailing in the evaporator, and means for circulating absorption liquid between the boiler and the absorber and for maintaining a higher total pressure in the boiler than that prevailing in the absorber, said last mentioned means including a pump for forcing liquid from the absorber into the boiler and a reduction valve in a conduit for conveying absorption liquid from the boiler to the absorber.

5. In absorption refrigerating apparatus of the type employing an inert gas, the combination of an absorber, an evaporator, a conduit for conveying a mixture of refrigerant gas and inert gas from said evaporator to said absorber, a conduit for conveying inert gas from said absorber to said evaporator, means for conveying absorption liquid into said absorber and including a jet cooperating with said first named conduit to cause the flow of the gaseous mixture into said absorber, and means for conveying liquid refrigerant into said evaporator and including a jet cooperating with said second named conduit to cause the flow of the inert gas into the evaporator.

6. In absorption refrigerating apparatus of the type employing an inert gas, the combination of an absorber, an evaporator, a conduit for conveying a mixture of refrigerant gas and inert gas from said evaporator to said absorber, a conduit for conveying inert gas from said absorber to said evaporator, means for conveying absorption liquid into said absorber and including a jet cooperating with said first named conduit to cause the flow of the gaseous mixture into said absorber, means for conveying liquid refrigerant into said evaporator and including a jet cooperating with said second named conduit to cause the flow of the inert gas into the evaporator, said second mentioned conduit having means therein for restricting the flow of gas therethrough whereby a higher pressure may be maintained in said absorber than in said evaporator.

7. In refrigerating apparatus of the continuous absorption type, a boiler system comprising two boilers and a rectifier, a liquid conduit for conveying absorption liquid from one boiler to the other, two gas conduits connected to each other and connecting the top of the boilers to the bottom of the rectifier, and means in one of said conduits for causing the condensate collecting in the rectifier to drain through the other gas conduit into only one of said boilers.

EARL BABCOCK.